United States Patent

Bock et al.

[15] 3,705,274

[45] Dec. 5, 1972

[54] CIRCUIT ARRANGEMENT FOR TELECOMMUNICATION INSTALLATIONS, ESPECIALLY, TELEPHONE EXCHANGE INSTALLATIONS WITH PARALLEL ALTERNATIVELY ACTING IDENTIFICATION SIGNAL TRANSMITTERS

[72] Inventors: Helmuth-Joachim Bock, 8000 Munich 71; Anton Sennefelder, 8031 Gilching, both of Germany

[73] Assignee: Siemens Aktiengesellschaft, Berlin and Munich, Germany

[22] Filed: May 18, 1971

[21] Appl. No.: 144,542

[30] Foreign Application Priority Data

May 20, 1970 Germany..........P 20 24 603.1

[52] U.S. Cl. ..........................................179/175.2 R

[51] Int. Cl. ..............................................H04m 3/24

[58] Field of Search ...179/175.2 R, 175.3, 175.31 R, 179/175, 175.11

[56] References Cited

UNITED STATES PATENTS 3,105,881 10/1963 Maurvshat..........179/175.2 R

*Primary Examiner*—Kathleen H. Claffy
*Assistant Examiner*—Douglas W. Olms
*Attorney*—Birch, Swindler, McKie & Beckett

[57] ABSTRACT

A circuit arrangement for telecommunication exchange installations is described wherein at least two identification signal transmitters are connected in parallel to common transmission line means to send over first connecting means constituted by rectifiers. The sending circuits in each transmitter corresponding to the common line means is combined into a collection line over second connecting means. A control device is provided which monitors the rectifiers for defects in the form of lowered resistance in the conduction blocking direction. Upon occurrence of such a defect, the control device limits operations to only the identification signal transmitter having the defective rectifier. The remaining transmitters are switched off and characterized as blocked.

4 Claims, 2 Drawing Figures

Figure 1:
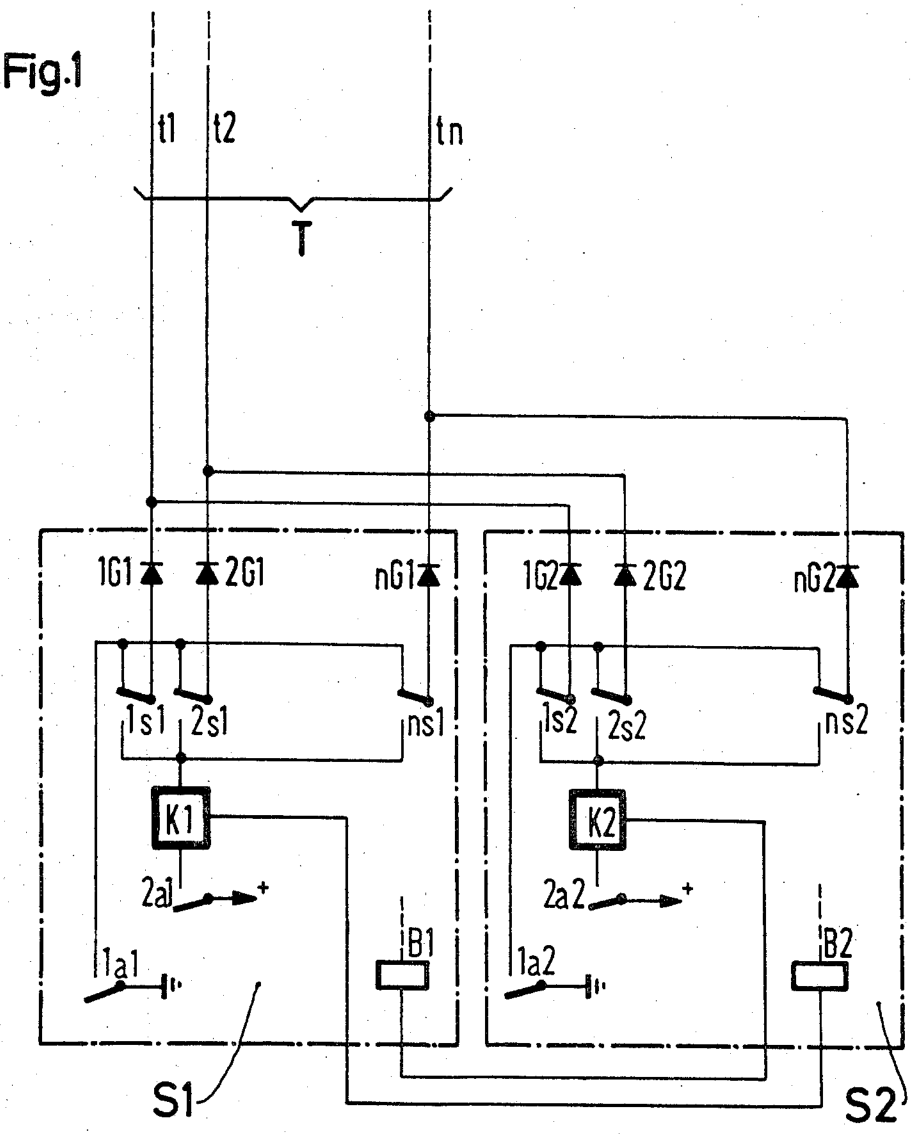

CIRCUIT ARRANGEMENT FOR TELECOMMUNICATION INSTALLATIONS, ESPECIALLY, TELEPHONE EXCHANGE INSTALLATIONS WITH PARALLEL ALTERNATIVELY ACTING IDENTIFICATION SIGNAL TRANSMITTERS

BACKGROUND OF THE INVENTION

The invention pertains to a circuit arrangement for telecommunication installations, especially telephone exchange installations in which at least two identification signal transmitters are connected parallel but, however, alternatively acting to the lines of a common line group for the sending of a signal over first decoupling switching means, and in which in each identification signal transmitter, the sending circuits of the group of sending circuits corresponding to the common line group is combined to a collection line each over second decoupling switching means.

With reference to the last mentioned decoupling, it is already known to connect sender circuits of an identification signal transmitter with a common collection line over decoupling elements. See hereto, FIG. 3 of the German Offenlegungsschrift No. 1,762,055. Here, for example, the totality of the row marker contacts developed as change over switches, who's rest sides are connected with a connection line, serves as identification signal transmitter. The row marker lines are connected decoupled over the row marker contact-rest sides with a common collection line. If a marker contact is activated and a marker potential is switched on over it to the pertinent row marker line, then the remaining, that is, the unmarked row marker lines are separated, that is, decoupled, from the marked row marker line. The same holds for a marking of several row marker lines at the same time. If several row marker lines are activated at the same time, then all row marker lines corresponding to them are decoupled from the not marked row marker lines.

The German Offenlegungsschrift No. 1,762,289, shows decoupling diodes (rectifiers) in place of the row marker contact-rest sides. Likewise, it is known, to provide resistances for decoupling in place of these decoupling rectifiers. In this case, preparatory for a marking of lines, an auxiliary voltage potential is switched on to all row marker lines over a resistance each. In the marking of lines, only a working potential is additionally switched on low-ohmicly to them. Thus, in this known solution the lines of the sending circuit group of an identification signal transmitter are also combined to a collection line decoupled from each other.

Thereamong, there results the necessity of substitute switching of identification signal transmitters, of which one is in operation and in case of a disturbance at least a second one is in reserve (if necessary or appropriate, continuous alternating operation of both identification signal transmitters). Thereby, as is well known, two identification signal transmitters, which operate parallel but yet alternatively, are connected with a common line group for the sending of a signal. The aforementioned connecting together of the sending circuits to a collection line undertaken within an identification signal transmitter makes it essential to decouple the sending circuits of the different identification signal transmitters from each other at their connection to the lines of the aforementioned common line group, for the known manner of operation, allowing only a single one of the several identification signal transmitters to operate at any given time, is not sufficient to prevent mutual influencing of the several identification signal transmitters, because without such a decoupling undesired coupling can result over the connection line of an identification signal transmitter not in operation at the time.

A known circuit arrangement therefore envisions connecting several identification signal transmitters functioning parallel but yet alternatively for the sending of a signal decoupled from each other with a common line group. The identification signal transmitters of this known arrangement are the two parallel but yet alternatively functioning adjusting assemblies of a motor selector-group selection stage, who's selectors are adjustable over a marker multiple common to the selectors as well as to the adjusting assemblies. With the help of these switch-on contacts, it is achieved that at all times only one single identification signal transmitter is connected with the sender circuit group. Under the term "sending circuit group" in the example of the motor selector-direction selection stage, the marking multiple is to be understood.

The object of the invention consists of providing a circuit arrangement through which in spite of reducing the expense for the decoupling switching means mentioned in the introduction serving the decoupling of the identification signal transmitters, a sufficient functional reliability of the identification signal transmission will be assured. This task is solved in that the first decoupling switching means are developed as rectifiers, and that a control device is provided which checks these decoupling rectifiers for rectifier defects in the form of a low resistance in the blocking direction, limits at the occurrence of such a defect an operation of the identification signal transmitter to that one with the rectifier defect, switches off the remaining identification signal transmitters and characterizes the remaining identification signal transmitters as blocked for the time being.

An advantage of the invention lies in the simplicity of the decoupling of the several identification signal transmitters through rectifiers in comparison with switching contacts in known older arrangements. Inasfar as a defect in the form of a low resistance in the blocking direction (rectifier short) arises in the inventive decoupling from each other of the several identification signal transmitters, whereby, more lines of the common line group are activated than actually were switched on over the sender circuits of the pertinent identification signal transmitter, not all identification signal transmitters must be switched off, but rather than one who's decoupling rectifier is defective in the given manner can remain in operation, and only the other identification signal transmitters — as a rule a single second identification signal transmitter — are, or is, switched off. A control device serves hereto. In accordance with a further development of the invention, it checks whether in the sending condition more lines of the common line group are activated than are actually switched on over the sending circuits of the pertinent identification signal transmitter. In accordance with further development of the invention, the control device is developed as a current measuring device. At the regular giving of a signal in the identification of only one of the sending circuits, the necessary control can be carried out in a simple manner, because in case of a defect, a double current flows.

In accordance with another further development of the invention, the control device simultaneously monitors whether in the sending condition, fewer lines of the common line group are activated than are actually switched on over the sending circuits of the pertinent identification signal transmitter; in this case, which infers a defect of a decoupling rectifier in the form of a blocking of the current in the direction of passage, the control device switches off the pertinent identification signal transmitter, characterizes it as blocked for the time being and causes another identification signal transmitter to be brought into operation. The control device, thus, effects, in case of a short circuit of a decoupling rectifier (low resistance also in the blocking direction) the temporary taking out of operation of the other identification signal transmitter and according to the last mentioned embodiment of the invention, in case of interruption of the current path of a decoupling rectifier (high resistance also in the direction of passage) the temporary taking out of operation of the affected identification signal transmitter.

In accordance with another further development of the invention, the control device is developed as a voltage measuring device. It is, thereby, in a position to watch over the decoupling rectifier in the rest condition with respect to its complete functional capability.

The control device developed as a voltage measuring device is, in accordance with further development of the invention, connected with a measuring input to the collection line; the lines of the common line group are further connected with an opposing potential, through which the decoupling rectifiers are stressed in the blocking direction in comparison with the inherent self potential of the measuring input.

Figure 2:
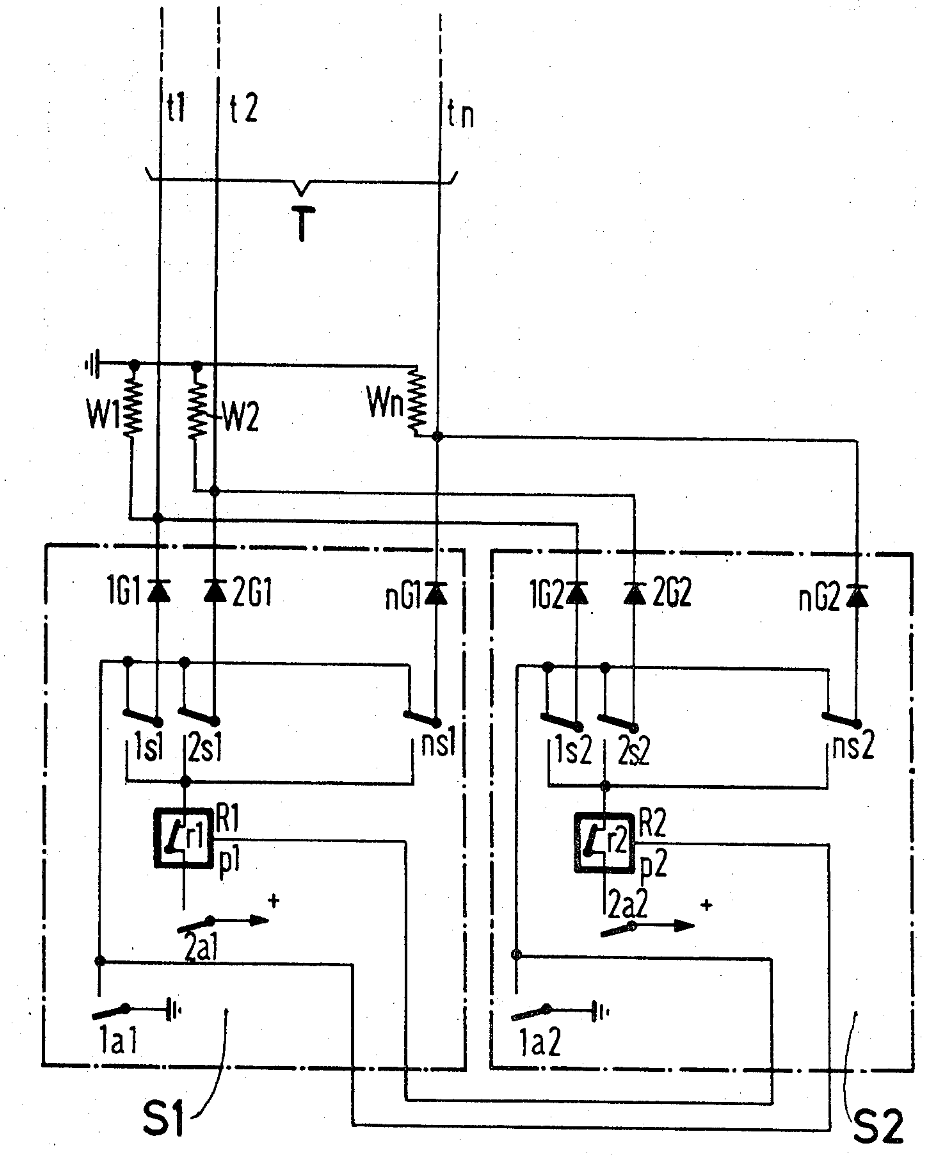

In the drawings, FIGS. 1 and 2 are working examples of the invention represented only by the component parts which contribute significantly to their understanding.

First of all, the switching arrangement according to FIG. 1 will be described.

There is envisioned a line group T, which consists of the lines *t*1, *t*2 through *tn*. Sending circuits of two identification signal transmitters are connected with the lines of this line group. These sending circuits each run over one of the decoupling rectifiers, 1G1 through nG1 and 1G2 through nG2. The sending circuits of an identification signal transmitter form a sending circuit group. The identification signal transmitters serve for the sending of signals over the lines of the line group T. They function parallel but yet alternatively; that means, always only one of the two identification signal transmitters can operate at a time.

Through the decoupling rectifiers 1G1 through nG2, the sending circuits of the identification signal transmitters S1 and S2 which sending circuits run over the decoupling rectifiers are decoupled from each other. That means, that a signal given off by an identification signal transmitter can only be passed on over the line of the line group T and cannot reach into the other identification signal transmitter.

Under the assumption that for reasons not explained here in detail, the current flowing over the marking contact — rest sides is substantially smaller than the current flowing over the marker contact working sides, the rectifiers 1G1 through nG2 are not arranged at the location as shown, but rather are individually connected in series with the marking contact - rest sides. Thereby, the said rectifiers can be measured significantly weaker with respect to their current loading capability. The principle of the decoupling of the sending circuits of the two identification signal transmitters S1 and S2 is not affected hereby.

Within each identification signal transmitter, for example, S1, the sending circuits corresponding to the line group T, which sending circuits run over the decoupling rectifiers 1G1 through nG1, are once again combined decoupled from each other to a collection line. The rest sides of the sending contacts 1s1 through ns1 take care of this decoupling.

This decoupled combination of the sending circuits to a collection line per each identification signal transmitter can serve different purposes. For the giving off of a signal over a group of signal circuits, it is usual to wire those lines over which no signal is sent out with a defined opposing potential which stands in opposition to the sending potential for the signal. It is thereby prevented that the transmission of a signal can be falsified through vagabond currents. Such vagabond currents easily arise with long line lengths as a result of coupling or in connecting together several sending circuit groups of this type to form a matrix, for example, an adjusting matrix of a relay switching multiple.

The decoupled combination of the sending circuits of an identification signal transmitter to form a collection line can also serve other purposes. See hereto, the German Offenlegungsschrift No. 1,762,055. Herein, the engagement contacts of a relay switching multiple - control matrix are developed as switch-over contacts for the engagement and return of switching relays. Engagement contacts for all rows and for all columns of this matrix are provided. The engagement command from a row engagement contact and a column engagement contact each are given off to the matrix over a row line each and a column line each. Before the engagement of a relay, all of the relays which lie in the same row and in the same column as the relay to be engaged, receive a return stimulus. In two switching phases separate from each other, a return characterizing signal is simultaneously switched on over the working sides of the activated row marking contacts and the rest sides of all unactivated column marking contacts and thereafter over the working sides of the activated column marking contacts and the rest sides of all unactivated row marking contacts. For this purpose, in the known switching arrangement, the as rest contact sides of the row marking contacts and column marking contacts developed as switch over contacts, are connected together to form a collection line for all row marking contacts and a collection line for all column marking contacts. For this connecting together of the sending circuits, to form a collection line per each identification signal transmitter, there could also exist therebeyond still further reasons.

The giving off of a signal on the part of an identification signal transmitter, for example, S1, is brought about in that the pertinent ones of the sending contacts 1s1 through ns1 are closed. It is assumed that only the sending contact 1s1 is closed. Subsequently, the contacts 1a1 and 2a1 of an unshown auxiliary relay are closed, whereby ground potential is switched onto all lines t2 through tn of the line group T which are not switched on, i.e., not marked, and plus potential is switched on over the control device K1 to the line t1. The marked lines and the unmarked lines of the line group T are decoupled from each other in the identification signal transmitter through the development of the sending contacts as switch over contacts. This decoupling could also be achieved in other ways. For example, the ground potential connectable over the contact 1a1 could be connectable over one resistance per each sending circuit with the sending circuits which lead over the decoupling rectifiers 1G1 through nG1 in place of the rest contact sides of the sending contacts 1s1 through ns1.

The giving off of a signal on the part of each of the identification signal transmitters is subject to the supervision of a control device K1. This pertains hereby to a device for the control of the current. It is assumed, that the number of lines of the line group T connected each time a signal is given off is equal. Therefore, one can also proceed under the assumption that the sending current flowing over the control device K1 at each giving off of a signal is equal.

Let it now be assumed that the sending contact 1s1 and the contacts 1a1 and 2a1 are activated. Further, let it be assumed that the decoupling rectifier 1G2 of the identification signal transmitter which is not sending at the time is defective in such a way that it has a low resistance in the blocking direction. Thereby the plus potential routed over the working side of the sending contact 1s1 and the decoupling rectifier 1G1 to the sending line t1 passes, in addition, over the decoupling rectifier 1G2, which has lost its blocking capability, and over the rest sides of the sending contacts 1s2 through ns2 and the rectifiers 2G2 through nG2 also to all of the sending lines t2 through tn. As a result of this, the sending current climbs to a higher value than it is planned or envisioned. The control device K1 of the identification signal transmitter S1 which is sending at the time hereupon recognizes that one of the decoupling rectifiers of the other identification signal transmitters S2, and indeed, the decoupling rectifier 1G2 is defective in such a manner than it has a low resistance in the blocking direction. As a result of this, the control device K1 gives off a characterizing signal to the identifying signal transmitter S2, in which transmitter the relay B2 is activated. The identifying signal transmitter S2 is thereby caused to take over the further giving off of signals. The control device K1 further causes, in a manner not shown in detail, the identifying signal transmitter S1 to be switched off and to be temporarily characterized as blocked. It is to be noted that the giving off of signals is transferred to that identification signal transmitter, in which one of the decoupling rectifiers is defective. In the case, that not just two, but rather several identification signal transmitters alternatively send out signals in the same manner over a single line group, the further giving off of signals is restricted in case of a rectifier defect of the described type to that identification signal transmitter which exhibits the defective decoupling rectifier.

For the case, that the control operations are carried out by a common central control device, the processes of the exchange of the previously described mutually controlling criteria for the two identification signal transmitters are also unfolded or developed through the central control device.

Further, in case of a rectifier defect, an alarm signal will be given off, in a not shown manner, which calls for location and correction of the malfunction.

For the case, that the giving out of a signal should take place on the part of the identification signal transmitter S1 over the decoupling rectifier 1G2, and that this rectifier is defective in such a manner that it has a high resistance in the direction of passage, this defect will likewise be detected by the control device K1. In spite of the fact that a sending circuit was switched on over the sending contact 1s2, no current flows in case of such a disturbance. Thus, in this case, a decoupling rectifier of that identification signal transmitter is defective over which the giving off of a signal should take place. In this case, the control device K2 causes on the one hand that the identification signal transmitter S2 is switched off and temporarily characterized as blocked and that the identification signal transmitter S1 is brought into operation in its stead. The control device of an identification signal transmitter thus causes, that with a rectifier defect in the form of a low resistance in the blocking direction of one of the decoupling rectifiers, that identification signal transmitter in which the defect lies is put into operation, and that with a rectifier defect in the form of a high resistance in the direction of passage of one of the decoupling rectifiers an identification signal transmitter in which this rectifier defect does not lie is put into operation.

In FIG. 2 is shown a circuit arrangement which differs from the circuit arrangement shown in FIG. 1 only in a few parts. In contrast with the circuit arrangement in FIG. 1, the control devices in the circuit arrangement according to FIG. 2 are designated with R1 and R2. These control devices are not devices for the control of current but rather they pertain to devices for the control of potential. Further, the relays B1 and B2 shown in FIG. 1 are omitted from the circuit arrangement according to FIG. 2. Further, in FIG. 2, high ohmic resistances W1 through Wn are provided, over which ground potential is connected to the lines t1 through tn in the rest position. This can refer hereby to formed resistances in the sense of the object of the application of the DAS No. 1,162,883.

The control device R1 is connected with its test input to the rest contact side of the sending contacts of the other identification signal transmitter. The same is true for the control device R2 of the identification signal transmitter S2. The control device R1 tests with positive opposing potential, whether all of the decoupling rectifiers 1G2 through nG2 of the other identification signal transmitter have their full blocking capability. In case that the ground potential makes its way through over one of the resistances W1 through Wn and one of the rectifiers 1G2 through nG2, to the test input P1 of the control device R1, the control device recognizes that one of the last mentioned decoupling rectifiers has lost its blocking capability. The control device causes, in an unshown manner, that the identification signal transmitter S1 is switched off (contact r1) and is characterized for the time being as blocked, and that the other identification signal transmitter with the defective decoupling rectifier is brought into operation in its stead.

The previously described manner of operation is valid in a corresponding manner for the watching over of the decoupling rectifiers 1G1 through nG1 by the control device R2 of the identification signal transmitter S2. Further, let it be pointed out that the control devices R1 and R2 exercise their supervisory function in the rest condition of the identification signal transmitter. The remaining functions of the giving off of signals are the same as in the circuit arrangement described with reference to FIG. 1. It should also be pointed out that the resistances W1 through Wn could be omitted. Preparatory for a test of the decoupling rectifiers, for example, 1G2 through nG2, in this case, by a control device, for example, R1, ground potential is switched on to the lines t1 through tn over a contact, for example, 1a1, and over the decoupling rectifiers, for example, 1G1 through nG1, of the identification signal transmitter doing the checking at the time, for example, S1. In case of a rectifier defect in the form of a low resistance in the blocking direction of one of the decoupling rectifiers, for example, 2G2, this ground potential makes its way through, in the previously described manner, to the affected control device, for example, R1. Suitable measuring circuits are provided, herefor, in the control devices R1 and R2 in a not shown manner.

We claim:

1. In telecommunication exchange installations having at least two alternatively functioning, identification signal transmitters connected in parallel to common transmission line means by means of first connecting means, each said identification signal transmitter having sending circuits with those sending circuits related to said common line means being combined over second connecting means to form a collection line, the improvement comprising:

rectifier means forming said first connecting means and control means for monitoring the condition of said rectifier means for determining the presence of defects in the form of lowered resistances in the conduction blocking direction of said rectifier means, said control means including means responsive to determination of an aforementioned defect for limiting signal transmitter operation to the one containing a defective rectifier and for switching off the remaining transmitters.

2. The improved telecommunication exchange installation defined in claim 1, wherein said control means is a current responsive device.

3. The improved telecommunication exchange installation defined in claim 1 wherein said control means is a voltage responsive device.

4. The improved telecommunication exchange installation defined in claim 1 wherein said control means includes means for determining whether more lines of said common line means are activated than actually are switched on over the sending circuits of the one of said identification signal transmitter sending at the time, said means, in case of discrepancy, shutting off said sending signal transmitter, causing it to be identified as blocked, and causing only that identification signal transmitter to operate which has a defective rectifier means.

* * * * *